(12) United States Patent
Daudelin et al.

(10) Patent No.: US 6,591,389 B1
(45) Date of Patent: Jul. 8, 2003

(54) TESTING SYSTEM FOR CIRCUIT BOARD SELF-TEST

(75) Inventors: Douglas S. Daudelin, Lincoln Park, NJ (US); Frank J. McNerney, Stanhope, NJ (US); Richard P. Wells, Pequannock, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/240,938

(22) Filed: Jan. 29, 1999

(51) Int. Cl.[7] .............................................. G01R 31/28
(52) U.S. Cl. ...................................................... 714/733
(58) Field of Search ................................ 714/733, 738, 714/722, 732, 724, 25, 55, 11; 708/530; 709/238, 224, 201; 702/120, 117, 119; 712/1; 716/4; 324/133, 212; 713/323; 703/28

(56) References Cited

U.S. PATENT DOCUMENTS

| 4,354,268 A | | 10/1982 | Michel et al. ................ 371/20 |
|---|---|---|---|
| 4,510,572 A | * | 4/1985 | Reece et al. ................. 324/133 |
| 4,519,077 A | * | 5/1985 | Amin .......................... 708/530 |
| 4,782,461 A | * | 11/1988 | Mick et al. .................... 703/28 |
| 5,247,254 A | | 9/1993 | Huber et al. ................. 324/212 |
| 5,557,558 A | * | 9/1996 | Daito .......................... 702/120 |
| 5,596,759 A | | 1/1997 | Miller et al. ................. 713/323 |

OTHER PUBLICATIONS

Test floor verification of multiprocessor hardware—Saha, A. Lin, J. Lockett, C. Malik, N. Shamsi, U. RISC 6000 Div., IBM, USA IEEE, On pp.: 373–377; Mar. 27–29, 1996.*

* cited by examiner

Primary Examiner—Albert Decady
Assistant Examiner—Guy Lamarre

(57) ABSTRACT

A circuit pack self-testing system adapted to carry out tests on circuit pack electronic devices. The self-testing system executes various test programs in a test suite, and stores a historical record from previous test suites. At the beginning of each test suite, a temporary record for test results is initialized. As the system progresses through the various test programs, the test programs update the temporary record.

33 Claims, 3 Drawing Sheets

TESTING SYSTEM FOR CIRCUIT BOARD SELF-TEST

FIELD OF THE INVENTION

This invention generally pertains to testing, maintenance, and repair of circuit packs. More particularly, this invention pertains to circuit pack self-test.

BACKGROUND OF THE INVENTION

In the large-scale production of modern electronic equipment, component inspection is necessary. In recent years, testing of integrated circuit devices has become essential. In quality control protocol, there has been a decrease in sample testing of circuit packs where a sample of circuit packs was randomly selected from a lot and is tested. Now, there is an increased reliance on testing all the circuit packs in all the lots. The practical reason for this is that some lots of components may contain as many as 5% rejects. Merely sampling a lot of this character will not extract all bad components. Hence bad components will continue through production to be integrated into a larger system and/or go into the field and presumably fail, resulting in substantial expense to fix or replace.

Experience has demonstrated that finding a bad component on a circuit pack at a board test is much less expensive than finding it in a system test after the circuit pack has been integrated into a larger system. In fact, if the bad component on a circuit pack is not located until the equipment reaches the field, it typically will cost about 1,000 times as much to find and replace it than if it had been detected and replaced during component inspection.

One procedure heretofore practiced in testing circuit packs is to input a series of test programs to the circuit pack and compare the results obtained to an expected result. This procedure includes the use of a computer controlled test system adapted to test various circuit packs. (The test system includes an interface to the circuit pack plus appropriate software to input test patterns and read results).

The "software" associated with a test system comprises those expedients by which the test system is explicitly told what to do through a step-by-step sequence of individual instructions which together constitute a program to perform some specific function or to yield a solution to a specific problem. An "instruction" is a group of bits that defines a particular computer operation. Thus, an instruction may direct a test system to move data, to do arithmetic and logic operations, to control input/output devices, or to make a decision as to which instruction is to be executed next.

The central processing unit (CPU) is that component of the test system which controls the interpretation and execution of instructions. In general, a CPU contains the following elements: "control", which includes control logic and instructions for decoding and executing the program stored in "memory"; "registers" which provide control with temporary storage for bits, bytes or words, an arithmetic and logic unit that performs arithmetic and logic operations under supervision of control; and an input/output port providing access to peripheral devices such as a keyboard and a display terminal.

The memory system is that component of the test system which holds data and instruction codes, each instruction or datum being assigned a unique address that is used by the CPU when fetching or storing the information. The read-only memory or ROM is a memory adapted to store information permanently, such as a math function, a microprogram, or a testing program. A memory that can be programmed by the user, but only once, is known as a programmable ROM or PROM; hence when a PROM is programmed, it then functions as a ROM.

The term read/write memory signifies memory that is capable of storing information (writing) and of retrieving the stored information (reading) at a similar rate. A typical random-access memory (RAM) is a read-write memory adapted to store information in such a way that each bit of information can be retrieved within the same amount of time as any other bit. RAM is volatile in nature and data stored in RAM is erased upon a power-failure, power reset or power malfunction.

Non-volatile memory or NVM is permanent in nature. The data stored in NVM is not erased upon a power-failure or power-reset.

The term "firmware" denotes a computer program or instruction used so often that it is stored in a read-only memory instead of being included in software. A microprogram (a special purpose program initiated by a single instruction in the system's main program) is an example of firmware, being somewhere between hardware and software in performance.

The use of a test system for testing integrated circuit devices and circuit packs is common. In practice, the test program may be written in an English-like symbolic language. The programmer expresses in this language the voltages, the currents, the times, the type of test to be performed, the truth tables to be used for functional tests, the test limits and all other instructions pertinent to the tests. These test programs are custom designed to test specific components of circuit packs. After a program has been prepared, circuit packs may be tested either at the manual test station by an automatic handler, or by whatever other handling means are available to the customer.

Conventional test systems effectively test circuit packs by executing various test programs. At the conclusion of each test program, the resulting data is compared to the expected data. If they match, the test is declared a success, and under the control of software, the test system then proceeds to the next test program. If a match is not obtained for any one test, then the circuit pack is defective and should be replaced.

After a circuit pack is deployed in the field, it is useful to occasionally self-test the system to detect failures, and a historical record of test results (resulting data from the test programs) is stored in a non-volatile memory. Often times problems are intermittent in nature and the historical record is used to troubleshoot a malfunctioning circuit pack. However, recording of all test results in non-volatile memory is impractical since recording every pass or failure would be too voluminous, and also because most non-volatile memories have a limited number of write-cycles which can be performed before they can no longer retain the data written to them.

Also, sometimes a component on a circuit pack under test contains a fault that causes a test program to halt or hang. In such a case, the test program doesn't make it to a point where test results may be recorded and no record of the failure nor any current test results will be stored. Typically, an autonomous timer, also known as a watchdog timer, resets the test program sequence and the process of test program is repeated. In the next iteration, the test program may complete successfully or may fail in the same way or another way.

Therefore, there exists a need for a test system which not only tests the various components of a circuit pack, but also keeps a record of the current test results and failures that provides information about the location of a defect even when a test program cannot run to completion. It is further desired that the test system keep a historical record of the test program results immediately pointing to the intermittently failing or failed components and the failed step of the test program.

SUMMARY OF THE INVENTION

A circuit pack testing method is disclosed having an on-board testing system that is capable of providing data as to the source/location of a fault on the circuit pack even when the fault is such that the test series cannot run to completion. Specifically, two registers are provided that are dedicated to storing values corresponding to start and end, respectively, of test portions of an overall test suite (a plurality of test portions/programs) for the circuit pack. Each individual test portion is commenced by incrementing the value in the start register. As each individual test is completed, the value in the end register is incremented. Thus, if the full test suite runs to completion the start and end registers will contain the same value. However, if a test portion cannot run to completion, the value stored in the start register will be one greater than the value stored in the end register.

Further, the value stored in the start register will disclose which test portion did not run to completion. When the overall test suite cannot run to completion, a watchdog timer eventually will reset the circuit pack. Part of the process of resetting the circuit pack involves storing the contents of the start and end registers in a dedicated non-volatile memory area. Thus, the values from the start and end registers that are stored in the non-volatile memory disclose the test portion in which the fault that led to the circuit pack reset occurred.

In a preferred embodiment, the non-volatile memory is capable of storing a plurality of sets of the start and end register contents in order to keep a history of the circuit pack's test performance. Preferably, in order to not overuse the non-volatile memory and to prevent the loss of potentially useful historical information, before a set of start and end register data is stored to non-volatile memory, the test software first checks if the contents of the start and end registers are identical to the latest historical record of the start and end register contents. If so, then the contents are not stored into the non-volatile memory. This feature is based on the assumption that, in such a circumstance, the same fault is being detected over and over again and thus there is no need to store such information repeatedly.

DETAILED DESCRIPTION OF A PREFERRED EMBODIMENT OF THE PRESENT INVENTION

Figure 1A:
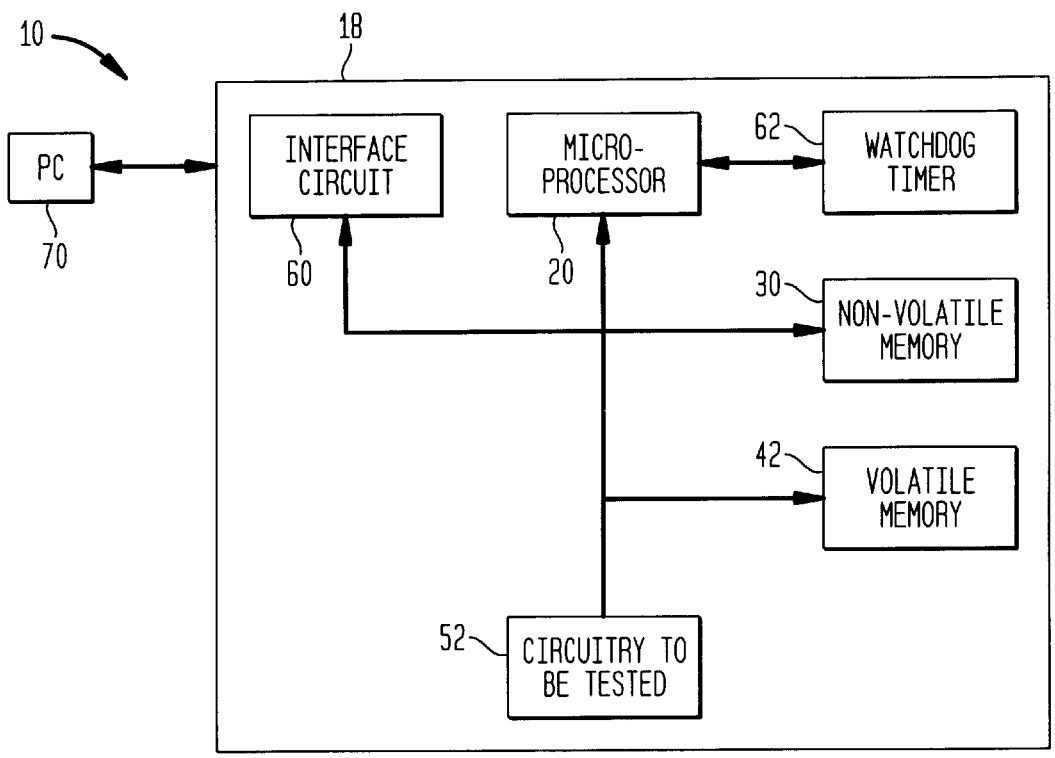
FIGS. 1A and 1B are a block diagram illustrating the components of a testing system 10 in accordance with the principles of the current invention.
Figure 1B:
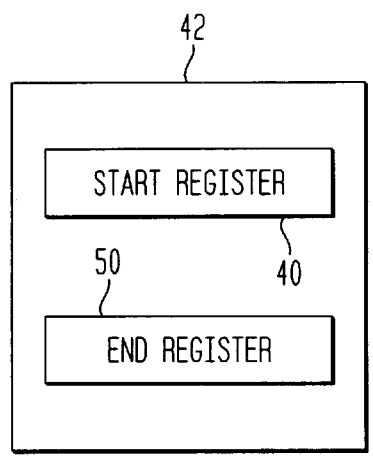

The circuit pack self-testing system 10 in its basic form is entirely contained within the circuit pack under test 18 (herein circuit pack 18). The circuit pack self-testing system 10 (herein testing system 10) located on circuit pack 18 is comprised of a microprocessor 20, non-volatile memory 30 (herein NVM 30), volatile memory 42, the circuitry (on the circuit pack 18) that is to be tested 52, and an interface circuit 60. The volatile memory 42, the non-volatile memory 30, the watch dog timer 62, and the circuitry to be tested 52 and the interface circuit 60 are connected to the microprocessor 20.

The circuit pack 18 is also connected to an optional personal computer (PC) 70. The PC 70 can be any desktop or laptop computer outfitted with an RS232 serial port for the purpose of real-time monitoring of test progress or for the implementation of additional tests which are not part of the self-test program, or additional testing specific to the factory test environment. The interface circuit 60, therefore is also capable of communicating with the PC via the RS232 serial data standard. It is typically implemented as a simple UART. The RS232 and UART interfaces are well known in the art.

The circuit pack self-testing system 10 carries out tests on the circuit pack 18. The testing is performed in a plurality of test segments called a test suite. In each iteration of the test suite, a series of subtests known as test programs (test portions) are executed. The test programs are contained in non-volatile memory 30 or volatile memory 42. In a typical test iteration, various testing programs test different circuitry 52 of the circuit pack 18. For example, within a test suite, memory, peripherals, input/output buffers have corresponding unique test programs which are executed in a sequential manner.

The testing system 10 uses volatile memory 42 and non-volatile memory 30 to store the test results. In volatile memory 42, the testing system 10 uses a plurality of registers to store the results from various test portions. As shown in FIG. 1A, in a preferred embodiment, two registers are used, a start register 40 and an end register 50. The start register 40 tracks and records the start of each test program and the end register 50 tracks and records the end of each test program.

In a preferred embodiment of circuit pack self-testing, a test iteration is commenced by incrementing the start register 40. Then the first test program is executed. Upon the completion of a test program, the end register 50 is incremented. For example, when the test iteration starts with the execution of the first test program, a "1" is recorded in the start register 40 ("1" will be recorded in its binary format). Upon the completion of the first test program, "1" will be recorded in the end register 50. As the execution of the second test program is commenced, the start register 40 is incremented to "2" indicating that the execution of the second test program has been started. Upon the completion of the second test program, the end register is incremented to "2". The above iteration is repeated until all the test programs in a test suite have been executed.

Upon the successful completion of a test, the start register 40 and the end register 50 have the identical information stored in them. In a typical case, this information will contain the identity of the last test program executed in the test.

After a test suite has been successfully completed, the testing system 10 clears the information (data values) stored in the start register 40 and the end register 50 by setting start register 40 and end register 50 to zero. The microprocessor then continues executing the firmware that implements the circuit pack design functionality.

In the next test iteration, typically after a power or other reset, testing is commenced once again by incrementing the start register 40 and executing the first test program in the test suite. Upon the successful completion of the first test program, the end register 50 is incremented. The same procedure is followed until this test iteration is completed.

However, if testing system 10 in a test iteration started the execution of a test program, but could not complete it due to an error or a failure, the value in the start register 40 will not match the value stored in the end register 50. For example, if testing system 10 started the execution of the third test program in a particular iteration, but could not complete it, the start register 40 and the end register 50 will have non-identical values stored in them. At the commencement of the third test program, the start register 40 was incremented to store "3", but the end register 50 still has "2" stored in it because the third test program was not completed and, thus, the end register 50 was not incremented.

If a test iteration does not reach completion due to the failure or error in one of its test program, the start register 40 and end register 50 are never reset to zero. The non-identical information in the start register 40 and the end register 50 causes detailed information from test programs prior to the failure to be stored in non-volatile memory 30 where it is available to a repair crew for trouble-shooting.

Thus, a simple comparison of the information stored in the start register 40 to the information stored in the end register 50 helps a repair crew or a trouble-shooter in his or her diagnosis. This makes self-testing of the circuit pack 18 in a remote location possible and if a failure occurs, or a test iteration stops abruptly, the non-identical information in the start register 40 and the end register 50 is available to a repair crew.

Also, if a test iteration experiences a problem, e.g., one of the test programs in the test suite cannot be completed, the testing system 10 restarts this particular test iteration. In this case, all the test programs from the previous iteration are repeated, starting from the very first test program executed in the previous test iteration.

If circuit pack 18 resets, the testing system 10 keeps track of such an event. This is accomplished by examining a flag when such a restart event occurs. This flag is herein termed "warmstart". The "warmstart flag" is a value which is stored in a particular register having a unique memory address and a pointer. This register is located in volatile memory 42.

When power is applied to the circuit pack, the contents of the "warmstart flag" do not contain any particular value, since it resides in volatile memory 42. This condition is called "cold-start" and is the correct starting point for each test iteration. The warmstart flag is set at the beginning of each test iteration to a pre-specified value and reset to something other than the pre-specified value at the successful completion of the test iteration. Therefore, at any point in the execution of the test iteration, if the warmstart flag is equal to the pre-specified value then the testing system 10 is actively performing tests.

If the circuit pack is restarted (rebooted) due to a failure to complete the test iteration, the contents of the volatile memory 42 will remain with the same value that were present just before the reboot. Therefore, the warmstart flag would still contain the pre-specified value, indicating that the test system 10 had been restarted due to a failure condition.

However, if the test iteration successfully runs to completion, the testing system 10 resets the warmstart flag to something other than the pre-specified value before transferring control to the firmware that implements the circuit pack's designed functionality. Since volatile memory 42 does not contain any particular values after power-up, the warmstart flag, by default, indicates the "coldstart" condition.

Within the volatile memory 42, the start register 40, end register 50, and warmstart flag register are assigned unique addresses.

The testing system 10 also utilizes non-volatile memory 30 to keep a historical record of test results. All the failed conditions are immediately recorded in the non-volatile memory 30. For example if a particular test program couldn't be completed due to a failure or an error, this failed condition is immediately recorded in the non-volatile memory 30 so that this information is available to the repair crew. This information will not be lost at a power failure or a power reset, and thus is permanent in nature.

The testing system 10 also records a successful completion of a particular test iteration in non-volatile memory 30. The test results from each test iteration (which are in volatile memory 42) are compared to the test results from the previous iteration (which are in non-volatile memory 30). If the current results are different, they are stored in another record in the non-volatile memory 30. If the current test results are the same as they were in the most recent historical record, they are simply discarded and the testing system 10 proceeds by transferring control to the circuit pack's firmware.

This results in an efficient use of the non-volatile memory 30. The cost associated with the non-volatile memory 30 is high and, thus, it is desired to minimize the information that is stored in the non-volatile memory 30. Also, excessive writing to the non-volatile memory 30 should be avoided because non-volatile memory 30 has a limited utility life, and each writing diminishes this utility life. The present invention accomplishes this purpose by minimizing the number of writings to the non-volatile memory 30.

Thus, in order to prevent overuse of the non-volatile memory 30, before the test results are stored to non-volatile memory 30, the testing system 10 first checks if the results of the test iteration are identical to the most recent historical record stored in non-volatile memory 30. This is especially important as the testing iterations are repeated whenever the circuit pack 18 is reset.

The watchdog timer 62 on the circuit pack 18 is capable of resetting the circuit pack 18 and consequently the microprocessor and test software if it detects that the program is hung. The watchdog timer 62 tracks the events occurring within the microprocessor 14. Typically the program is required to periodically "pet the dog" to keep it from resetting. If a test iteration is hung at a particular test program, the watchdog timer 62 will wait for a pre-determined time period for an event ("petting") to occur, and if no event occurs within the pre-determined time period, the watchdog timer 62 will reset the circuit pack 18 and restart the test iteration.

The optional PC 70, is present when the circuit pack 18 is tested during manufacturing test. The suite of factory tests include, but are not limited to, the tests contained in the non-volatile program memory storage 30. Through the optional PC 70, the factory can review the results of circuit pack self-testing, or perform tests that are not part of the circuit pack self-testing. For example, the testing of circuit pack interfaces that terminate off-board, can be performed.

Figure 2A:
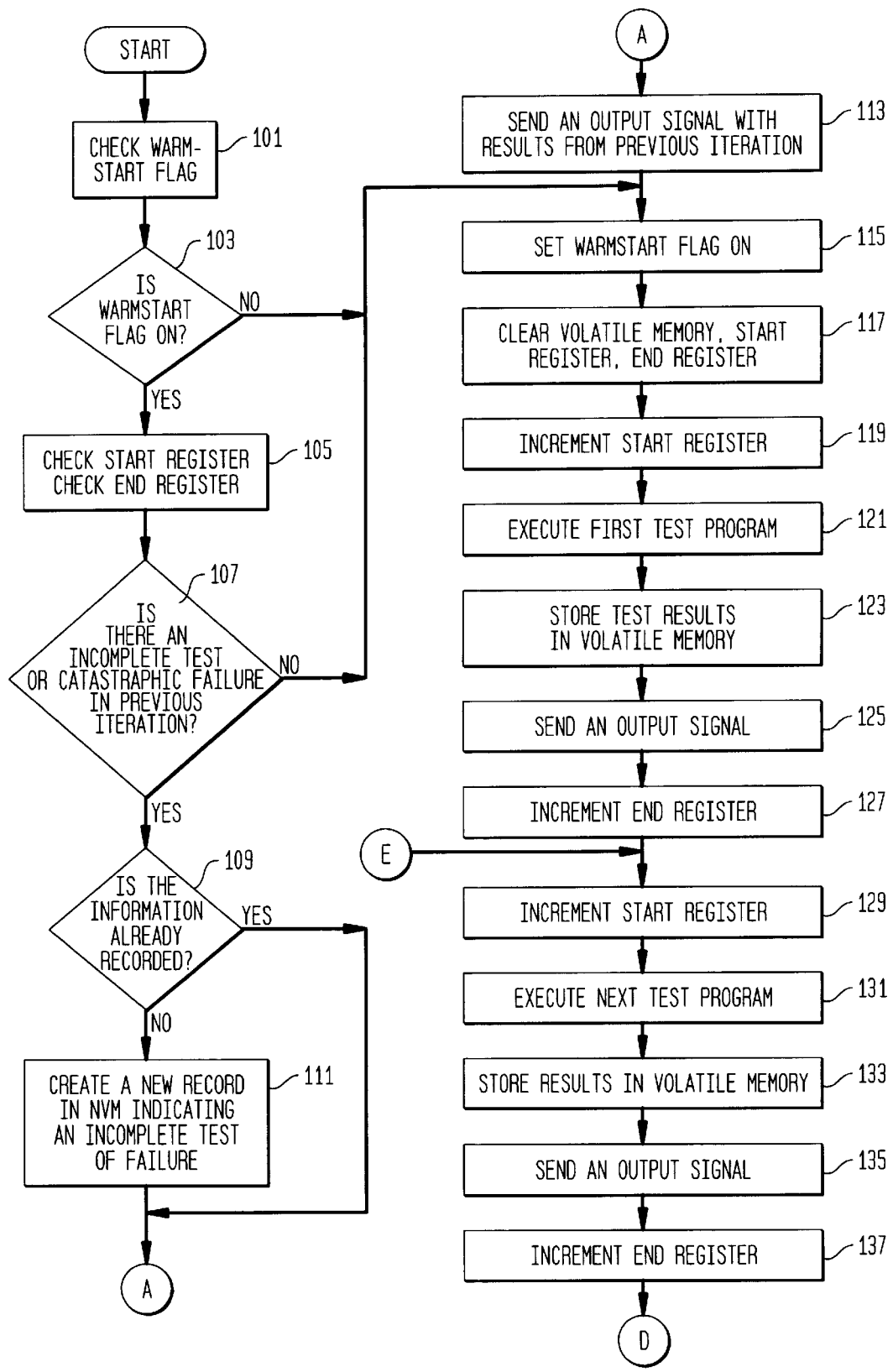
FIGS. 2A and 2B comprise a flow-chart depicting the various steps utilized by the process utilized in testing system 10.

During the progression of the circuit pack self-test (the process shown in FIG. 2 and FIG. 2A), various messages are sent to the optional PC 70 to indicate in real-time the test results and the detection of failures from previous iterations. These messages are sent without regard or knowledge of whether the optional PC 70 is connected.

The circuit pack 18 may also comprise an LED display which can be used to output any failed conditions and/or successful test results of a test program. In alternate embodiments, an user has the capability to select the display assembly 30, which may be a computer terminal or data terminal.

Figure 2B:
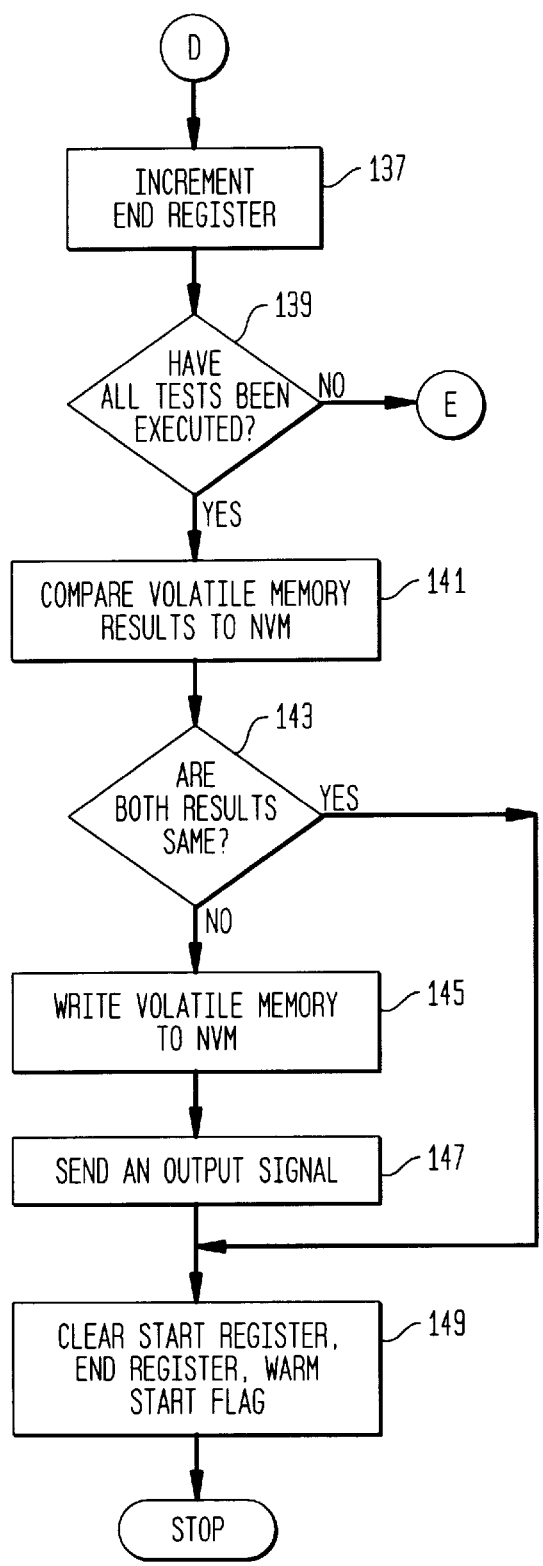

FIG. 2 is a flowchart illustrating the steps used by circuit pack self-testing system.

In FIG. 2, the process starts in step 101 by checking the "warmstart flag".

The next step 103 is a decision function to determine whether the warmstart flag is set. If the flag is set, indicating that it is not a cold-start, the process proceeds to step 105 to check the contents (data values) of the start register 40 and the end register 50. If the warmstart flag is not set, indicating that it is a cold start (normal reset of the circuit pack), the process proceeds to step 115 where the warmstart flag is set in preparation for testing.

After checking the data values in the start register 40 and the end register 50 in step 105, the process in decision function 107 determines whether there was an incomplete test program or a failure in the previous iteration. This is accomplished by comparing the data values in the start register 40 and the end register 50. If both the data values match, it means the previous iteration was successful and there were no failures, the process proceeds to step 115.

If the data values in the start register 40 and the end register 50 do not match, indicating that there was a failure in the previous iteration, the process proceeds to another decision function 109 to determine whether this failure condition had been previously recorded in non-volatile memory (NVM) 30.

If it is determined in decision function 109 that the information has not been recorded in NVM 30, the process proceeds to step 111 to create a new record in NVM 30 indicating the identity of an incomplete test program or test failure from the previous iteration.

After creating a new record in NVM 30, the results from the previous iteration are output to the optional PC in step 113. The output signal is indicative of a failure occurring within a test program. This output signal can be converted an alarm signal, an audio signal, or an LED response. In a preferred embodiment, this output signal is a text based message that indicates the identity of the test program experiencing errors or failures. As each test program corresponds to a particular component on the circuit pack, by analyzing the identity of the failing test program, the corresponding fault location can be located.

In the next step 115, the warmstart flag is set. Once the warmstart flag is set, it remains set unless there is a power failure or a power reset. Step 115 also is a next logical step from decision function 103 indicating that if the testing program is a new testing iteration or is a result of a power reset, the next logical step is to set the warmstart flag.

In the next step 117, the old data values stored in the start register 40 and the end register 50 are cleared so that new information associated with the current test iteration may be recorded in these registers.

In the next step 119, the start register 40 is incremented indicating the start of the first test program. If it is a new testing iteration, data value in the start register 40 will be "1" indicating the start of the first test program.

The next step 121 is the execution of the first test program. The results of this test program are recorded in volatile memory 42 in step 123. Upon the completion of the first test program, an output signal (message) is sent to the optional PC in step 125 indicating that the first test program has been executed. Also, the end register 50 is incremented in step 127 to indicate completion of the first test program.

The next step 129 is the execution of testing the next test program by incrementing the start register 40. Step 131 is the execution of the next test program. Once again, the results of this test program are stored in volatile memory 42 in step 133. Upon the completion of the next test program, an output signal (message) is sent to the optional PC in step 135. The end register 50 is incremented in step 137 to indicate the completion of the next test program.

The next step 139 is a decision function to determine whether all the test programs have been executed. If all the tests have not been executed, the process returns to step 129 to increment start register 40 and repeat the steps 129 through 139 for the next test program.

If all the test programs have been executed, the next step 141 is to compare the results stored in volatile memory 42 to NVM 30. If the results in volatile memory 42 are the same as the most recent results recorded in NVM 30, no further recording of data is necessary as the data already exists in NVM 30 and process proceeds to step 149. At this point the microprocessor would begin executing the firmware for the circuit pack's intended functionality.

However, if the results in the volatile memory 42 vary from NVM 30, the process proceeds to step 145 to store the test results in NVM 30. This is done so that a historical record of test results is available to, for instance, a technician dispatched to fix or replace a failed circuit pack.

In step 147, an output signal (message) is sent to the optional PC indicating that new data has been recorded in the NVM 30 which is different from the previous iteration and that the testing is complete.

The next step 149 is to clear the data recorded in the start register 40 and the end register 50, and to reset the warmstart flag. As all the desired test results have been recorded in NVM 30, the information from volatile memory 42 and data values in the start register 40 and the end register 50 are no longer needed. The data values in the start register 40 and the end register 50 are only needed as markers while test iteration is running.

Upon each power reset, the steps 101 to 149 are repeated starting with the very first test iteration. If during a test iteration, the process encounters a failure in a test program, the test iteration will be halted. The watchdog timer eventually will cause the processor to restart, and the testing iteration will start from the beginning just as if it was a power reset, except that "warmstart flag" will still be set.

The above process (step 101 to step 149), by using start register 40 and end register 50, provides an effective way to test the circuit pack. Testing system 10 and its corresponding process makes an efficient use of the memory 16 (comprising volatile memory 42 and NVM 30) as test results are only stored if they are not identical to previously stored results. Also, all new failure modes are recorded in NVM 30 for historical purposes. All the records are recorded in a lengthy memory stack, but there are designated registers, addressed by pointers, for recording failures.

A historical record of failures is stored. Therefore, one can easily determine whether there was a failure ever recorded during a particular test program or within a specific category.

The testing system 10 may be modified by adding an additional feature, whereby PC 70 not only receives output signals indicating failures, but, responsive thereto, also transmits a testing sequence to the testing system 10 for further diagnostics of a failure or to perform additional tests that are not circuit board level in nature.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

We claim:

1. A circuit pack having self-testing capability, said circuit pack comprising:
   a processor for executing program instructions;
   a memory for storing data;
   a program resident in said circuit pack for running a test suite for self-testing components on said circuit pack, said test suite comprising a plurality of test portions wherein;
      said program examines a first designated memory location prior to beginning the test suite to determine whether a previously executed test suite ran to completion;
      said program creates a record in a second designated memory location located in said memory if said examination reveals that the previously executed test suite did not run to completion, said record indicating the failure which occurred during the previously executed test suite;
      said program initializes said first designated memory location in said memory prior to running the first one of said test portions; and
      each test portion of the test suite stores testing results in said first designated location.

2. The circuit pack of claim 1, wherein said test portions test specific component groups on said circuit pack.

3. The circuit pack of claim 1 wherein said program further causes said circuit pack to generate an output signal indicating that the program was unable to run to completion when it is determined that the previously executed test suite did not run to completion.

4. The circuit pack of claim 1 wherein said record created in said memory location comprises the identity of said test portions which were halted.

5. The circuit pack of claim 1, wherein said first memory location comprises a first register and a second register, wherein;
   at the start of each test portion, said program stores in said first register a value indicative of the corresponding test portion;
   at the end of each test portion, said program stores in said second register a value indicative of the corresponding test portion;
   prior to beginning a first one of said test portions, said program determines if a value stored in said first register corresponds to a value stored in said second register;
   if said values in said first and second registers do not correspond to each other, said program stores information indicating the value stored in at least one of said first register and second registers in said second designated memory location, whereby a record is created in said second memory location of the last test portion to be completed.

6. The circuit pack of claim 1 wherein said first designated memory location is located in volatile memory and said second memory location is located in non-volatile memory.

7. The circuit pack of claim 1 wherein prior to creating said record in said second designated memory location, said program examines the most recently created record and creates said record only if no duplicate record of said most recently created record will be generated.

8. The circuit pack of claim 1 wherein said program further generates a set of test results for each test portion and stores those results to non-volatile memory if the most recent prior results were different.

9. The circuit pack of claim 8 wherein said program further generates an alarm signal if the most recent prior results were different.

10. The circuit pack of claim 1 wherein said memory further comprises a third designated memory location, and wherein said program tracks whether said self-testing is initiated from a cold start or a warm start and stores such information in said third designated memory location.

11. A method for testing circuit packs, said testing utilizing a test suite, said test suite comprising a plurality of test programs, said method comprising:
   (i) initializing a first record;
   (ii) starting execution of said test suite;
   (iii) storing test results of said test programs in said first record during the execution of said test suite; and
   (iv) prior to each subsequent execution of said test suite, examining said first record to determine whether a previously executed test suite ran to completion, and creating a second record if said previous test suite did not run to completion, said second record indicating the failure which occurred during the previously executed test suite.

12. The method of claim 11, wherein said step (iii) comprises the steps of:
   (a) prior to executing each of said test programs, recording a first value indicative of the corresponding test program in said first record; and
   (b) upon completion of each of said test programs, recording a second value indicative of the corresponding test program in said first record.

13. The method of claim 12 wherein step (iv) comprises the step of comparing said second value to said first value to determine whether said previous execution of said test suite ran to completion.

14. The method of claim 11 further comprising sending an alarm signal when said failure is encountered during the execution of said test program.

15. The method of claim 14 wherein said step of sending an alarm signal comprises the step of generating a visual indication.

16. The method of claim 14 wherein said step of sending an output signal comprises the step of generating an audio signal.

17. The method of claim 11 further comprising sending an output signal indicating completion of said test suite.

18. The method of claim 11 further comprising recording information indicating said failure in a non-volatile memory.

19. The method of claim 18 further comprising querying said recorded information for further diagnosis.

20. The method of claim 11, wherein said step (iv) further comprises examining the most recently created said second record, and creating said second record only if no duplicate of said most recently created second record will be generated.

21. The method of claim 11 further comprising:
   repeating step (i) to step (iv), for a next test suite said next test suite utilizing different test programs than in an immediately preceding test suite.

22. The method of claim 21 said method further comprising the step of recording the identity of said test suite being executed.

23. The method of claim 11 wherein step (i) to step (iv) are repeated if a failure has been encountered during the execution of a test suite.

24. The method of claim 11 further comprising:

repeating steps (i) to step (iv), for a next test suite, said next test suite repeating said test program utilized in an immediately preceding test suite.

25. A method for testing circuit packs, said testing utilizing a test suite, said test suite comprising a plurality of test portions, said method comprising:

examining a first designated memory location prior to beginning said test suite to determine whether a previously executed test suite ran to completion; and creating a record in a second designated memory location located in said memory if said examination reveals that the previously executed test suite did not run to completion, said record indicating the failure which occurred during the previously executed test suite.

26. The method of claim 25 further comprising the steps of:

initializing said first designated memory location prior to running the first one of said test portions; and storing testing results in said first designated memory location of each test portion of said test suite.

27. The method of claim 25 further comprising the step of generating an output signal when it is determined that the previously executed test suite did not run to completion.

28. The method of claim 25 wherein said test portions test specific component located groups on said circuit pack.

29. The method of claim 25 wherein said step of creating a record in said second designated memory location comprises the step of storing the identity of said test portions which were halted.

30. The method of claim 25 wherein said first designated memory location comprises a first register and a second register, wherein said method further comprising the steps of;

at the start of each test portion, storing in said first register a first value indicative of the corresponding test portion;

at the end of each test portion, storing in said second register a second value indicative of the corresponding test portion;

prior to beginning a first one of said test portions, determining if said first value corresponds to said second value;

if said first value and second value do not correspond to each other, storing information indicating the value stored in at least one of said first register and second registers in said second designated memory location, whereby a record is created in said second designated memory location of the last test portion to be completed.

31. The method of claim 25 wherein said first designated memory location is located in a volatile memory and said designated second memory location is located in a non-volatile memory.

32. The method of claim 25 wherein prior to creating said record in said second designated memory location, said method further comprises the step of examining the most recently created record and creates said record only if no duplicate record of said most recently created record will be generated.

33. The method of claim 25 further comprising the step of generating a set of test results for each test portion and storing those results to non-volatile memory if the most recent prior results were different.

* * * * *